(12) United States Patent
Vermeulen (10) Patent No.: US 12,251,916 B2
(45) Date of Patent: *Mar. 18, 2025

(54) METHODS FOR MANUFACTURING PANELS (71) Applicant: Unilin, BV, Wielsbeke (BE)

(72) Inventor: Bruno Vermeulen, Aldeneik-Maaseik (BE)

(73) Assignee: Unilin, BV, Wielsbeke (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,941

(22) Filed: Sep. 20, 2023

(65) Prior Publication Data

US 2024/0009982 A1 Jan. 11, 2024

Related U.S. Application Data

(63) Continuation of application No. 16/960,047, filed as application No. PCT/IB2018/060437 on Dec. 20, 2018, now Pat. No. 11,794,460.

(30) Foreign Application Priority Data

Jan. 4, 2018 (BE) .................................. 2018/5001

(51) Int. Cl.
*B32B 27/20* (2006.01)
*B32B 27/14* (2006.01)
(Continued)

(52) U.S. Cl.
CPC .............. *B32B 37/02* (2013.01); *B32B 27/14* (2013.01); *B32B 27/20* (2013.01); *B32B 27/304* (2013.01);
(Continued)

(58) Field of Classification Search
CPC .. B05D 3/12; B32B 5/16; B32B 21/02; B32B 21/08; B32B 21/12; B32B 27/08;
(Continued)

(56) References Cited

U.S. PATENT DOCUMENTS 1,971,067 A 8/1934 Fess
3,173,804 A 3/1965 Standfuss
(Continued)

FOREIGN PATENT DOCUMENTS

CA 1064778 10/1979
CA 1237344 5/1988
(Continued)

OTHER PUBLICATIONS

Z. Lu et al., "Layer-by-layer nanoparticle coatings on lignocellulose wood microfibers", Colloids and Surfaces A: Physicochem. Eng. Aspects 292 (2007), Jun. 20, 2006, p. 56-62.
(Continued)

*Primary Examiner* — Michael A Tolin
(74) *Attorney, Agent, or Firm* — Capitol City TechLaw (57) ABSTRACT

A method is provided for manufacturing panels having a substrate and a decorative top layer that may include a printed motif and a transparent or translucent protective layer formed there above. The method may involve providing the substrate. A finishing layer may be applied for forming a portion of the protective layer. Recesses may be formed at a surface of the finishing layer. Forming the recesses may involve applying a surface structure-altering agent that is colored.

14 Claims, 6 Drawing Sheets

(51) Int. Cl.
  *B32B 27/30* (2006.01)
  *B32B 27/40* (2006.01)
  *B32B 37/02* (2006.01)
  *B32B 37/10* (2006.01)
  *B32B 37/24* (2006.01)
  *B32B 38/06* (2006.01)
  *B44C 3/00* (2006.01)
  *B44C 5/04* (2006.01)
  *E04F 13/08* (2006.01)
  *E04F 15/02* (2006.01)

(52) U.S. Cl.
  CPC .............. *B32B 27/40* (2013.01); *B32B 37/10* (2013.01); *B32B 37/24* (2013.01); *B32B 38/06* (2013.01); *B44C 3/005* (2013.01); *B44C 5/0476* (2013.01); *E04F 13/0871* (2013.01); *E04F 15/02* (2013.01); *B32B 2037/243* (2013.01); *B32B 2264/107* (2013.01); *B32B 2307/554* (2013.01); *B32B 2307/584* (2013.01); *B32B 2419/04* (2013.01); *B32B 2471/00* (2013.01); *B32B 2607/00* (2013.01)

(58) Field of Classification Search
  CPC ....... B32B 27/14; B32B 27/20; B32B 27/304; B32B 27/308; B32B 27/40; B32B 33/00; B32B 37/02; B32B 37/10; B32B 37/1027; B32B 37/24; B32B 2037/243; B32B 38/06; B32B 38/14; B32B 38/145; B32B 2038/0076; B32B 2260/025; B32B 2264/10; B32B 2264/101; B32B 2264/102; B32B 2264/1021; B32B 2264/1023; B32B 2264/107; B32B 2307/412; B32B 2307/414; B32B 2307/554; B32B 2307/584; B32B 2419/04; B32B 2471/00; B32B 2607/00; B32B 2607/02; B44C 1/20; B44C 1/205; B44C 1/22; B44C 3/005; B44C 5/04; B44C 5/0469; B44C 5/0476; B44F 9/02; B44F 9/04; E04F 13/08; E04F 13/0871; E04F 15/02; E04F 15/105; E04F 15/107
  See application file for complete search history.

(56) References Cited

U.S. PATENT DOCUMENTS

| | | | |
|---|---|---|---|
| 3,293,094 A | 12/1966 | Nairn et al. | |
| 3,399,106 A | 8/1968 | Palmer et al. | |
| 3,434,861 A | 3/1969 | Luc | |
| 3,554,827 A | 1/1971 | Yamagishi | |
| 3,574,659 A | 4/1971 | Kwart et al. | |
| 3,674,611 A | 7/1972 | Petry et al. | |
| 3,769,143 A | 10/1973 | Kulesza | |
| 3,810,774 A | 5/1974 | Pittman | |
| 3,811,915 A | 5/1974 | Burrell et al. | |
| 3,905,849 A | 9/1975 | Bomboire | |
| 3,983,307 A | 9/1976 | Power et al. | |
| 4,006,048 A | 2/1977 | Cannady, Jr. et al. | |
| 4,050,409 A | 9/1977 | Duchenaud et al. | |
| 4,076,566 A | 2/1978 | Power | |
| 4,097,635 A | 6/1978 | Sanz Hernandez et al. | |
| 4,233,343 A | 11/1980 | Barker et al. | |
| 4,298,646 A | 11/1981 | Haemer et al. | |
| 4,312,686 A | 1/1982 | Smith et al. | |
| 4,396,566 A | 8/1983 | Brinkmann et al. | |
| 4,397,896 A | 8/1983 | Moran | |
| 4,426,820 A | 1/1984 | Terbrack et al. | |
| 4,895,759 A | 1/1990 | Crawford | |
| 5,082,495 A | 1/1992 | Tijima | |
| 5,112,671 A | 5/1992 | Diamond et al. | |
| 5,227,359 A | 7/1993 | Mikoshiba et al. | |
| 5,296,447 A | 3/1994 | Suto et al. | |
| 5,407,895 A | 4/1995 | Egashira et al. | |
| 5,478,631 A | 12/1995 | Kawano et al. | |
| 5,494,885 A | 2/1996 | Kudo et al. | |
| 5,516,472 A | 5/1996 | Laver | |
| 5,612,280 A | 3/1997 | Takahashi et al. | |
| 5,639,539 A | 6/1997 | DeProspero et al. | |
| 5,712,222 A | 1/1998 | Shirai et al. | |
| 5,763,048 A | 6/1998 | Takahashi | |
| 5,836,128 A | 11/1998 | Groh et al. | |
| 5,863,632 A | 1/1999 | Bisker | |
| 5,916,662 A | 6/1999 | Schmidt | |
| 5,939,231 A | 8/1999 | Kawamura et al. | |
| 5,988,503 A | 11/1999 | Kuo | |
| 5,989,378 A | 11/1999 | Liu et al. | |
| 6,006,486 A | 12/1999 | Moriau et al. | |
| 6,132,878 A | 10/2000 | Kojima et al. | |
| 6,150,009 A * | 11/2000 | Stecker ................... | B29C 41/22 428/209 |
| 6,174,095 B1 | 1/2001 | Desie et al. | |
| 6,291,127 B1 | 9/2001 | Dagan et al. | |
| 6,300,279 B1 | 10/2001 | Macedo | |
| 6,345,481 B1 | 2/2002 | Nelson | |
| 6,455,206 B1 | 9/2002 | Hasegawa et al. | |
| 6,477,948 B1 | 11/2002 | Nissing et al. | |
| 6,517,674 B1 | 2/2003 | Das | |
| 6,551,694 B1 | 4/2003 | Imamichi et al. | |
| 6,599,592 B1 | 7/2003 | Schulz | |
| 6,605,337 B1 | 8/2003 | Mori et al. | |
| 6,632,488 B2 | 10/2003 | Okumura et al. | |
| 6,652,931 B1 | 11/2003 | Otani et al. | |
| 6,677,006 B2 | 1/2004 | Otani et al. | |
| 6,677,008 B2 | 1/2004 | Chen et al. | |
| 6,706,372 B2 | 3/2004 | Schulz et al. | |
| 6,773,104 B2 | 8/2004 | Cornelius et al. | |
| 6,821,584 B2 | 11/2004 | Tashiro et al. | |
| 6,835,676 B2 | 12/2004 | Kim et al. | |
| 6,843,560 B2 | 1/2005 | Romano, Jr. et al. | |
| 6,979,487 B2 | 12/2005 | Scarbrough et al. | |
| 6,991,830 B1 * | 1/2006 | Hansson ................ | E04F 13/072 427/205 |
| 7,026,023 B2 | 4/2006 | Masuda et al. | |
| 7,029,096 B2 | 4/2006 | Weijkamp et al. | |
| 7,243,469 B2 | 7/2007 | Miller et al. | |
| 7,335,407 B2 | 2/2008 | Landry-Coltrain et al. | |
| 7,695,783 B2 | 4/2010 | Merkel et al. | |
| 7,854,799 B2 | 12/2010 | Hoogmartens | |
| 8,085,442 B2 | 12/2011 | De Waal | |
| 8,316,604 B2 | 11/2012 | Thiers | |
| 8,328,303 B2 | 12/2012 | Frati | |
| 8,465,804 B2 | 6/2013 | Provoost et al. | |
| 8,500,230 B2 | 8/2013 | Thiers et al. | |
| 8,771,811 B2 | 7/2014 | Takahashi et al. | |
| 9,321,278 B2 | 4/2016 | Clement et al. | |
| 9,566,823 B2 | 2/2017 | Clement et al. | |
| 9,770,937 B2 | 9/2017 | Clement | |
| 10,471,769 B2 | 11/2019 | Clement | |
| 11,794,460 B2 * | 10/2023 | Vermeulen ............... | B32B 27/40 |
| 2001/0022607 A1 | 9/2001 | Takahashi et al. | |
| 2001/0027217 A1 | 10/2001 | Jaetsch et al. | |
| 2001/0036552 A1 | 11/2001 | Otani et al. | |
| 2002/0043175 A1 | 4/2002 | Walker et al. | |
| 2002/0114927 A1 | 8/2002 | Brossman et al. | |
| 2002/0136862 A1 | 9/2002 | Dong et al. | |
| 2002/0142106 A1 | 10/2002 | Bethune et al. | |
| 2003/0068473 A1 | 4/2003 | Okumura et al. | |
| 2003/0108718 A1 | 6/2003 | Simon et al. | |
| 2003/0138599 A1 | 7/2003 | Kamikubo | |
| 2003/0138618 A1 | 7/2003 | Courtoy et al. | |
| 2003/0148073 A1 | 8/2003 | Landry-Coltrain et al. | |
| 2003/0159385 A1 | 8/2003 | Thiers | |
| 2004/0026017 A1 | 2/2004 | Taylor et al. | |
| 2004/0081773 A1 | 4/2004 | Ishida et al. | |
| 2004/0086678 A1 * | 5/2004 | Chen ...................... | B44C 5/0461 428/44 |
| 2004/0102120 A1 | 5/2004 | Plusquellec et al. | |
| 2004/0141041 A1 | 7/2004 | Tsutsumi et al. | |
| 2004/0146695 A1 | 7/2004 | Hardwick | |
| 2004/0161588 A1 | 8/2004 | Mauk et al. | |

(56) References Cited

U.S. PATENT DOCUMENTS

| | | |
|---|---|---|
| 2004/0191547 A1 | 9/2004 | Oldorff |
| 2004/0209011 A1 | 10/2004 | Kondo et al. |
| 2004/0261964 A1 | 12/2004 | Asano et al. |
| 2005/0153243 A1 | 7/2005 | Rundle et al. |
| 2005/0171245 A1 | 8/2005 | Ni et al. |
| 2005/0191443 A1 | 9/2005 | Sunagawa et al. |
| 2005/0221024 A1 | 10/2005 | Teshima et al. |
| 2005/0221056 A1 | 10/2005 | Schwonke et al. |
| 2005/0249923 A1 | 11/2005 | Reichwein et al. |
| 2006/0060101 A1 | 3/2006 | Nasser |
| 2006/0088672 A1 | 4/2006 | Totani et al. |
| 2006/0130421 A1 | 6/2006 | Nollet et al. |
| 2006/0188757 A1 | 8/2006 | Magnusson |
| 2006/0204773 A1 | 9/2006 | Kwon et al. |
| 2006/0234027 A1 | 10/2006 | Huusken |
| 2006/0279621 A1 | 12/2006 | Morohoshi |
| 2006/0280870 A1 | 12/2006 | Halot et al. |
| 2007/0084368 A1 | 4/2007 | Vest et al. |
| 2007/0202263 A1 | 8/2007 | Kitamura et al. |
| 2007/0283648 A1 | 12/2007 | Chen |
| 2008/0011167 A1 | 1/2008 | Prager et al. |
| 2008/0090032 A1 | 4/2008 | Perrin et al. |
| 2008/0138560 A1 | 6/2008 | Windmoller |
| 2008/0172856 A1 | 7/2008 | Brouckaert et al. |
| 2008/0311355 A1 | 12/2008 | Chen et al. |
| 2008/0318008 A1 | 12/2008 | Wielstra et al. |
| 2010/0047455 A1 | 2/2010 | Hoogmartens |
| 2010/0253735 A1 | 10/2010 | Irita |
| 2010/0282407 A1 | 11/2010 | van der Zwan et al. |
| 2011/0159208 A1 | 6/2011 | Price |
| 2011/0211012 A1 | 9/2011 | Irita |
| 2012/0021147 A1 | 1/2012 | Liao |
| 2013/0070017 A1 | 3/2013 | Fujii et al. |
| 2013/0286088 A1 | 10/2013 | Ryberg et al. |
| 2014/0023832 A1 | 1/2014 | Pervan et al. |
| 2014/0028772 A1 | 1/2014 | Pervan |
| 2014/0033635 A1 | 2/2014 | Pervan et al. |
| 2014/0196618 A1 | 7/2014 | Pervan et al. |
| 2014/0370209 A1 | 12/2014 | Walp |
| 2020/0130381 A1 | 4/2020 | Clement et al. |

FOREIGN PATENT DOCUMENTS

| | | | |
|---|---|---|---|
| CN | 1119152 A | | 3/1996 |
| CN | 2301491 Y | | 12/1998 |
| CN | 2364121 Y | | 2/2000 |
| CN | 1259073 A | | 7/2000 |
| CN | 1425098 A | | 6/2003 |
| CN | 1973089 A | | 5/2005 |
| CN | 1628968 | | 6/2005 |
| CN | 1796700 A | | 7/2006 |
| CN | 101014468 A | | 8/2007 |
| CN | 101084125 | | 12/2007 |
| CN | 101545312 A | | 9/2009 |
| CN | 101925705 A | | 12/2010 |
| CN | 102256806 A | | 11/2011 |
| CN | 102501698 | | 6/2012 |
| CN | 101998896 | | 12/2014 |
| CN | 104903118 A | | 9/2015 |
| DE | 1534802 | | 4/1970 |
| DE | 2721292 A1 | | 11/1978 |
| DE | 2856391 A1 | | 7/1980 |
| DE | 19532819 A1 | | 3/1997 |
| DE | 19715268 A1 | | 10/1998 |
| DE | 19725829 C1 | | 8/1999 |
| DE | 19916546 A1 | | 10/2000 |
| DE | 19945279 C1 | | 4/2001 |
| DE | 19955081 C1 | | 8/2001 |
| DE | 102004036664 | | 3/2006 |
| DE | 102004036922 A1 | | 3/2006 |
| DE | 202008008597 U1 | | 8/2008 |
| DE | 102007013135 A1 | | 9/2008 |
| DE | 102015110236 A1 | | 12/2016 |
| EP | 0007230 A2 | | 1/1980 |
| EP | 0054405 A1 | | 6/1982 |
| EP | 0130559 A2 | | 1/1985 |
| EP | 0562402 A1 | | 9/1993 |
| EP | 0737591 A1 | | 10/1996 |
| EP | 1044822 A1 | | 10/2000 |
| EP | 1108529 A2 | | 6/2001 |
| EP | 1138467 A1 | | 10/2001 |
| EP | 1681103 A2 | | 7/2006 |
| EP | 1700689 A1 | | 9/2006 |
| EP | 1749676 A1 | | 2/2007 |
| EP | 1872959 A1 | | 1/2008 |
| EP | 1923223 | | 5/2008 |
| EP | 2132041 B1 | | 12/2009 |
| EP | 1290290 B1 | | 1/2010 |
| EP | 2293946 B1 | | 3/2011 |
| EP | 1857511 B1 | | 9/2011 |
| EP | 2402154 A1 | | 1/2012 |
| EP | 2431190 A2 | | 3/2012 |
| EP | 2695745 A1 | | 2/2014 |
| EP | 2883712 B1 | | 8/2020 |
| FR | 2827529 A1 | | 1/2003 |
| GB | 900958 | | 7/1962 |
| GB | 1015701 A | | 1/1966 |
| GB | 1467899 A | | 3/1977 |
| GB | 1520964 | | 8/1978 |
| GB | 2020998 A | | 11/1979 |
| GB | 2145371 A | | 3/1985 |
| JP | 60-255843 | | 12/1985 |
| JP | 62-127225 | | 6/1987 |
| JP | 3-169967 | | 7/1991 |
| JP | 6-64108 | | 3/1994 |
| JP | 7-180333 | | 7/1995 |
| JP | 8-197697 | | 8/1996 |
| JP | 10-747 | | 1/1998 |
| JP | 2000-170361 | | 6/2000 |
| JP | 2001071447 A | | 3/2001 |
| JP | 2002-316397 A | | 10/2002 |
| KR | 1996-0005785 | | 1/1999 |
| WO | 9511333 | | 4/1995 |
| WO | 9627721 | | 9/1996 |
| WO | 9718949 | | 5/1997 |
| WO | 9747834 A1 | | 12/1997 |
| WO | 9917930 | | 4/1999 |
| WO | 9935335 | | 7/1999 |
| WO | 9945060 A1 | | 9/1999 |
| WO | 0047841 | | 8/2000 |
| WO | 0147724 A1 | | 7/2001 |
| WO | 0147725 A1 | | 7/2001 |
| WO | 0148333 A1 | | 7/2001 |
| WO | 0183488 A1 | | 11/2001 |
| WO | 0196689 A1 | | 12/2001 |
| WO | 0204206 A1 | | 1/2002 |
| WO | 2004042168 A1 | | 5/2004 |
| WO | 2004074577 A1 | | 9/2004 |
| WO | 2005028750 A1 | | 3/2005 |
| WO | 2005033204 A1 | | 4/2005 |
| WO | 2005116337 A1 | | 12/2005 |
| WO | 2006013469 A1 | | 2/2006 |
| WO | 2006033706 A1 | | 3/2006 |
| WO | 2006066776 A2 | | 6/2006 |
| WO | 2006090287 A1 | | 8/2006 |
| WO | 2006130708 A2 | | 12/2006 |
| WO | 2007059967 A1 | | 5/2007 |
| WO | 2007119888 A1 | | 10/2007 |
| WO | 2008005228 A2 | | 1/2008 |
| WO | 2008110254 A1 | | 9/2008 |
| WO | 2008110275 A1 | | 9/2008 |
| WO | 2008134823 A1 | | 11/2008 |
| WO | 2009013580 A2 | | 1/2009 |
| WO | 2009077561 A1 | | 6/2009 |
| WO | 2009080376 A1 | | 7/2009 |
| WO | 2009124704 A1 | | 10/2009 |
| WO | 2009153680 A2 | | 12/2009 |
| WO | 2010000358 A1 | | 1/2010 |
| WO | 2010070485 A2 | | 6/2010 |
| WO | 2011124503 A2 | | 10/2011 |

OTHER PUBLICATIONS

Safety Data Sheet, HP Tinte C1892A—Black, Admitted prior art.

(56) References Cited

OTHER PUBLICATIONS

G. A. Smook, Handbook of pulp & paper terminology: a guide to industrial and technological usage, 2nd edition, Angus Wilde Publications Inc., 2001, p. 246.
HP DesignJet 2500/2000CP Printer User's Guide, C4704A/C4703A, Admitted prior art, p. 1-340.
Material Safety Data Sheet, HP Tinte C1893A—No. 93 Cyan, Admitted prior art.
Material Safety Data Sheet, HP Tinte C1895A—No. 95 Yellow, Admitted prior art.
Material Safety Data Sheet, HP Tinte C1894A—No. 94 Magenta, Admitted prior art.
Hue P. LE, "Progress and Trends in Ink-jet Printing Technology", Journal of Imaging Science and Technology, vol. 42, No. 1, Jan./Feb. 1998, p. 49-62.
Zhenglin Tang et al., "Special Printing Technology", Printing Industry Press, Sep. 2007, p. 36-38.
Shlomo Magdassi, "The Chemistry of Inkjet Inks", World Scientific Publishing Co., Pte. Ltd., 2010, Chapter 7.
M. J. Moura et al., "The Use of Mercury Intrusion Porosimetery to the Characterization of Eucalyptus Wood, Pulp and Paper", Iberoamerican Congress on Pulp and Paper Research 2002, p. 1-7.
Monica Badila et al., "Evaluation of the compatibility between low pressure melamine (LPM) film printing substrates and inkjet inks," Eur. J. Wood Prod., 2012, p. 639-649, published online.
Sabreen, "UV Color Inkjet Printing for Plastics: Technology Developments for Digital Applications", https://plasticsdecorating.com/articles/2007/uv-color-inkjet-printing-for-plastics-technology-developments-for-digital-applications/, Apr. 1, 2007.

* cited by examiner

METHODS FOR MANUFACTURING PANELS

This application is a continuation application of U.S. patent application Ser. No. 16/960,047 filed Jul. 3, 2020 now U.S. Pat. No. 11,794,460, which is a US National Phase Application of International Application No. PCT/IB2018/060437 filed Dec. 20, 2018, the entire contents of both of which are incorporated herein by reference.

This application claims priority under 35 USC § 119(a)-(d) to Belgian patent application No. BE2018/5001, which was filed on Jan. 4, 2018, the entire contents of which are incorporated herein by reference.

BACKGROUND

1. Field

This invention relates to methods for manufacturing panels, more particularly decorative panels, such as floor panels, wall panels, ceiling panels and furniture panels.

More particularly, the invention relates to methods for manufacturing panels of the type comprising at least a substrate and, provided on this substrate, a decorative top layer, for example, with a printed motif. Herein, this may relate, for example, to floor panels, furniture panels, ceiling panels, wall panels or the like, which substantially consist of an MDF or HDF (Medium or High Density Fiberboard) basic panel or substrate and a top layer provided hereon, or which are composed substantially of synthetic material, for example, with a PVC (Polyvinyl chloride)-based basic panel or substrate and a top layer provided hereon.

In particular, the invention relates to a method wherein one or more material layers are provided on the substrate, wherein at least one of these material layers comprises a printed motif. Preferably, this herein relates to a motif which is at least partially obtained by means of a print, which is performed directly or indirectly on the substrate. However, the invention also is applied with panels wherein the motif is realized in another manner, for example, by printing this motif on a carrier sheet and providing this carrier sheet on the aforementioned substrate, such as this is the case, for example, with DPL (Direct Pressure Laminate) laminate panels, wherein the respective carrier sheet usually consists of paper, or such as this can be the case with LVT (Luxury Vinyl Tiles) panels, wherein the respective carrier sheet usually consists of a synthetic foil, such as a PVC foil.

2. Related Art

Panels of which the motif is obtained by means of a print performed on the substrate are known as such, for example, from U.S. Pat. Nos. 1,971,067, 3,173,804, 3,554,827, 3,811,915, WO 01/48333, WO 01/47724, US 2004/0026017, WO 2004/042168, EP 1 872 959, DE 197 25 829 C1 or DE 195 32 819 A1. From the aforementioned documents, it is also known that said material layers can comprise one or more basic layers, wherein these basic layers extend substantially underneath said print, and/or can comprise one or more finishing layers, which extend substantially above said motif. Such finishing layers can comprise, for example, transparent or translucent synthetic layers, which form a protective layer above the, whether or not printed, motif and can contain, for example, wear-resistant particles, such as aluminum oxide. It is not excluded that this protective layer contains a material sheet, such as a paper sheet, which is provided, for example, with a synthetic material, such as an amino resin, as can be the case with laminate panels of the DPL type. In the case of LVT panels, preferably a protective layer is used which substantially consists of transparent PVC.

From the aforementioned patent documents, various methods are known for providing the surface of a coated panel with a structure. From WO 2004/042168, it is known to provide recesses in the substrate itself or in a basic layer and to perform a print in the form of a motif on this structured substrate. From WO 01/47725, U.S. Pat. Nos. 3,811,915 and 3,554,827, it is known to provide a lacquer-repelling agent on the printed motif, such that subsequently provided hereon transparent lacquer layer hardens selectively, such that a structure is formed on the final panel. From WO 01/48333, it is known to provide, by means of a template or press roller, impressions on a lacquer layer provided above the motif. From WO 01/47724, it is known to provide, by means of an inkjet, a transparent lacquer layer selectively above the motif and in this manner realize a structure, wherein the thus provided lacquer layer covers the motif only partially and a portion of the motif is unprotected against wear. From DE 197 25 829 C1 it is known to provide, by means of a template or press roller, impressions in a protective layer provided above the motif. In DE 197 25 829 C1 namely protective layers applied in liquid form are applied, which contain thermosetting resin, such as melamine.

The techniques named herein above leave much to be desired in respect to flexibility and/or in respect to realizable structures. So, for example, is it difficult to realize with these techniques in a smooth manner structures which correspond to the motif applied by the print. Moreover, according to some of the known techniques the motif remains partially unprotected against, for example, wear or moisture penetration.

As a solution for the above problems, WO 2010/070485 discloses various techniques for flexibly providing structures on coated panels. WO'485 relates, amongst others, to the application of a digital technique for providing a lacquer-repelling agent, wherein this applied agent then determines at least a portion of the surface structure of the panel. DE 10 2015 110 236 A1 relates to a similar technology.

The known techniques show the disadvantage that the realized top layers are not really resistant against scratches or other wear. The inventor has found that the use of sufficiently large hard particles in top layers which are structured by means of a lacquer-repelling agent, have a disadvantageous influence on the formation of the desired recesses. The hard particles exert an influence on the viscosity, the flow, the surface tension and other features of the material of the top layer.

Further, the maximally achievable depth and/or the depth-to-width ratio of a digital structure obtained in accordance with the prior art leaves much to be desired.

SUMMARY

The present invention, according to its various independent aspects, primarily aims at alternative methods for manufacturing panels, which, according to various preferred embodiments thereof, can be performed smoother and/or more economic than the methods of the prior art and/or offer a solution to one or more disadvantages of the methods of the prior art.

To this aim, the invention, according to its first independent aspect, relates to a method for manufacturing panels, wherein these panels comprise at least a substrate and a decorative top layer, wherein said decorative top layer comprises at least a printed motif and a transparent or translucent protective layer formed there above, wherein the method comprises at least the following steps:

the step of providing a substrate;

the step of applying a first finishing layer for forming a first portion of the aforementioned protective layer;

the step of at least partially hardening the aforementioned first finishing layer;

the step of applying a second finishing layer for forming a second portion of the aforementioned protective layer;

the step of forming recesses at the surface of said second finishing layer, with the characteristic that the aforementioned first finishing layer comprises hard particles. As the aforementioned hard particles are situated in the first, already at least partially hardened finishing layer, they hardly exert any influence on the step of forming recesses in the surface of the second finishing layer situated there above.

It is noted that according to the invention the second finishing layer is situated above the first finishing layer, or that, in other words, said second finishing layer is situated closer to the upper surface of the final respective panel than said first finishing layer.

Further, it is noted that of course the aforementioned top layer can also comprise further layers or portions. So, for example, underneath the aforementioned first finishing layer also at least a print layer is present, and underneath the aforementioned first finishing layer an earlier-formed finishing layer can be situated. Between the first and second finishing layer, and/or on top of the aforementioned second finishing layer, also one or more further finishing layers can be provided.

It is evident that the method of the first aspect preferably also includes the complete hardening of the first as well as the second finishing layer and that this preferably is performed after the step of forming recesses at the surface of the second finishing layer has been finished.

Preferably, the aforementioned second finishing layer is free from hard particles, such that the step of forming recesses can be performed in an optimum manner.

According to another possibility, the aforementioned second finishing layer also comprises hard particles. In such case, the average diameter of the hard particles in said second finishing layer preferably is smaller than the average diameter of the hard particles in said first finishing layer. According to still another possibility or in combination therewith said second finishing layer also comprises hard particles, wherein the shape of the hard particles in said second finishing layer is different from the shape of the hard particles in said first finishing layer. So, for example, in the second finishing layer rather oblong particles can be used, whereas in the first finishing layer rather spherical particles are used, or vice versa.

Preferably, the hard particles of said first finishing layer protrude from the surface of the first finishing layer. In this manner, they can penetrate in the final panel up into the second finishing layer. Hereby, a good wear resistance of the second finishing layer can be obtained, without the hard particles having a notable influence on the step of forming recesses in the surface of the there above-situated second finishing layer. It is clear that in such embodiment the second finishing layer may or may not be provided with hard particles, as also explained herein above.

For the hard particles, preferably use is made of corundum or aluminum oxide particles. According to other possibilities, use can also be made of silicon carbide or silicon oxide, or a mixture of the aforementioned possibilities for the hard particles.

Preferably, the aforementioned first and/or second finishing layer are at least partially obtained by applying further to harden material in liquid form on the substrate, such as, for example, a lacquer to be cured, for example, to be cured by UV or electron beam, or the like. Applying in liquid form may be performed, for example, by means of one or more rollers. The aforementioned hard particles can be provided in the first and possibly in the second finishing layer, either by being mixed in the material which is to be applied in liquid form and hardened, or by strewing them into the still wet finishing layer concerned or depositing them in another manner, or by forming part of a material sheet which is provided in or on the still wet finishing layer.

According to an alternative method for applying the still at least partially to harden material of the first and/or second finishing layer, use can be made of a carrier sheet, for example, a paper sheet, which initially is provided with the respective material, for example, by means of impregnation techniques, such as immersion, spraying, rolling on, and wherein this carrier sheet then, together with the still at least partially to harden material, is provided on the substrate for forming the first and/or the second finishing layer. As aforementioned, in such case the hard particles of the first and/or the second finishing layer can form part of such treated material sheet.

Preferably, the step of forming recesses comprises at least the application of surface structure-altering agents, preferably chemical agents. It is in particular with such techniques that the method of the invention shows its advantages. However, it is not excluded that the method would be performed in combination with techniques for forming recesses known from the prior art mentioned in the introduction, such as, for example, in combination with a technique wherein the surface of the second finishing layer is mechanically deformed, for example, by means of a structured press element or a structuring foil.

As aforementioned, the step of forming recesses preferably comprises at least the application of surface structure-altering agents. Preferably, this herein relates to chemical agents. Such method can be brought into practice in several concrete manners, of which below, without being exhaustive, three particular possibilities will be listed.

According to a first possibility, the method shows the characteristic that the aforementioned surface structure-altering agent is a chemical agent which breaks open the material of said second finishing layer. This may relate, for example, to a chemical agent with an etching effect or with an abrasive or corrosive effect on the respective material. The residual products of the breaking open have to be removed from the surface in order to form the recesses. The respective agent can be provided before the material of the second finishing layer is provided and/or after the material of the second finishing layer is provided, however, preferably at least after the material of the second finishing layer is provided.

According to a second possibility, the method shows the characteristic that the aforementioned surface structure-altering agent is a chemical agent which repels the material of the aforementioned second finishing layer in that it has a different, in particular lower, surface tension than the material of the finishing layer. Hereby, it can be achieved that the material is locally repelled and a recess is formed. The respective agent can be provided before the material of the second finishing layer is provided and/or after the material of the second finishing layer is provided, however, preferably at least after the material of the second finishing layer is provided. It is clear that for a good working of the chemical agent, it is necessary that the second finishing layer is still wet when the chemical agent is applied, and/or that the second finishing layer is applied wet over the already present chemical agent. Preferably, the chemical agent and the material of the finishing layer show a difference in surface tension between 5 and 15 mN/m, wherein the chemical agent has the lower surface tension. As such, the chemical agent may show the basic composition of an inkjet ink and the finishing material the basic composition of common lacquers or other finishing materials which have to be applied in liquid condition. The surface tension of both can be adjusted, for example, by using small amounts of surfactants, for example, silicone-containing surfactants, such as BYK333.

According to a third possibility, the method shows the characteristic that the aforementioned surface structure-altering agent is an agent of which the volume can be changed, such that a surface structure is created in a mechanical manner. Herein, this may relate, for example, to expandable, preferably thermally expandable, microspheres. Preferably, microspheres are applied which consist of a polymer skin which encloses a hydrocarbon gas. The polymer of the skin can be acrylonitrile-based. The hydrocarbon gas can be based, for example, on butane or pentane. Commercially available thermally expandable microspheres comprise, for example, Expancel© from Akzo Nobel. The respective agent can be applied before the material of the second finishing layer is applied and/or after the material of the second finishing layer is applied, however, preferably before the material of the second finishing layer is applied. According to a variant, by means of the present third possibility protrusions can be provided at the surface instead of recesses.

It is not excluded that two or more of the above three possibilities are combined for forming a structure at the surface of one and the same panel. So, for example, can the second possibility be applied for forming recesses, whereas the third possibility is applied for forming protrusions. Also, it is not excluded that the techniques of the above possibilities are combined with a method step in which the substrate and/or the top layer is formed by means of a structured press element or press foil.

Preferably, the aforementioned material of the first and/or second finishing layer comprises a UV-curing layer or consists substantially of UV-curing lacquer, possibly with hard particles, as also mentioned above. When in such case the above-mentioned second possibility for forming recesses is applied, the aforementioned chemical agent preferably is a lacquer-repelling agent. According to another possibility, the aforementioned wear-resistant material substantially consists of a thermoplastic synthetic material, such as, for example, of polyvinyl chloride (PVC), whether or not with plasticizers, or of polyurethane (PU) or of polyethylene (PE) or of polyethylene terephthalate (PET). In the case of PVC, benzotriazole or tolyltriazole can be applied as a chemical agent.

With the same view as in the first independent aspect, the present invention, according to its second independent aspect, also relates to a method for manufacturing panels, wherein these panels comprise at least a substrate and a decorative top layer, wherein the aforementioned decorative top layer comprises at least a printed motif and a transparent or translucent protective layer formed there above, and wherein the method comprises at least the following steps:

the step of providing a substrate;
the step of applying a first finishing layer for forming a first portion of the aforementioned protective layer;
the step of forming recesses at the surface of the aforementioned first finishing layer;
the step of applying a second finishing layer for forming a second portion of the aforementioned protective layer;
the step of forming recesses at the surface of said second finishing layer.

As the protective layer is composed in at least two layers which each are provided with recesses at the respective surface, a larger depth and/or a larger depth-to-width ratio and/or a larger variation of the recesses can be achieved.

It is clear that the step of forming recesses at the surface of the first and/or the second finishing layer preferably comprises applying surface structure-altering agents. The method of the second aspect is of particular interest when the surface structure-altering agent is a chemical agent which increases the surface tension of the material of the respective finishing layer, for example, in the case it relates to a lacquer-repelling agent, such as in the second possibility discussed herein above in the scope of the first aspect. With the method of the second aspect, a recess with a large depth-to-width ratio can be obtained in a simpler manner. As the protective layer is provided in several thinner partial layers, the repelling force of the chemical agent can be limited or, in other words, the amount of chemical agent which must be applied can be limited while still achieving a relief alteration.

According to a particular embodiment, the step of forming recesses at the surface of said first finishing layer comprises the application of surface structure-altering agent, whereas the step of forming recesses at the surface of said second finishing layer occurs automatically due to the previously applied surface structure-altering agent for forming the recesses in the first finishing layer.

According to still another particular embodiment, the step of forming recesses at the surface of said first finishing layer as well as the step of forming recesses at the surface of said second finishing layer comprises applying surface structure-altering agent, however, preferably with different composition and/or with different effect, namely working according to respectively different possibilities mentioned herein above in the scope of the first aspect. It is evident that in this manner a particular relief can be created at the surface of the final panel. According to a variant, which may or may not be combined therewith, particular effects can also be created by hardening the respective finishing layers in a different manner, for example, hardening them after a different time, by choosing the volume or drop volume of the surface structure-altering agent otherwise, by choosing the layer thickness of the respective finishing layers otherwise, and so on. All these parameters allow adjusting the relief fine or coarse, as one sees fit.

Preferably, the recesses in the aforementioned second finishing layer are formed at the location of the recesses in the aforementioned first finishing layer. By such technique, a maximum depth of the recesses can be achieved.

It is clear that the method of the second aspect further also can show the characteristics of the method of the first independent aspect. Herein, the hard particles of the first independent aspect then can be provided in the aforementioned first finishing layer of the second independent aspect, and/or in a layer which is provided on the substrate before this first finishing layer, and preferably is free from recesses and/or is not subjected to techniques for forming recesses at the surface thereof.

In general, thus both with the first as with the second independent aspect of the invention, the material of the first and/or the second finishing layer preferably is transparent or translucent.

It is possible that the wear-resistant materials of the first and the second finishing layer show a gloss degree differing from each other. In this manner, according to the first as well as according to the second independent aspect particular embodiments can be achieved. When, for example, the first finishing layer is made glossy and the second finishing layer matte, or more matte, glossy recesses can be created in an otherwise matte surface, or, when the first finishing layer is matte and the second finishing layer is glossy, matte recesses are created in an otherwise glossy surface. Preferably, a layer made matte has a gloss degree of 10 or less, whereas a glossy made layer has a gloss degree of more than 10, or even more than 15 or 20, as measured according to DIN 67530. For an optimum result, the difference in gloss degree between the first and the second finishing layer preferably is at least 10 points as measured according to DIN 67530.

According to the invention, the aforementioned top layer comprises a printed motif which extends underneath said first finishing layer. Herein, the aforementioned recesses preferably are formed corresponding to the printed motif. In other words, by means of the method of the first and/or the second independent aspect a relief is obtained at the surface of the panels with a pattern of recesses which corresponds to the pattern of the printed motif. In the case of a printed motif representing a wood structure, the wood pores or wood nerves can be imitated by a structure of recesses at the location of the wood pores and/or which follows the wood nerves.

In general, the recesses obtained in the first and/or the second aspect preferably relate to recesses which imitate relief characteristics of natural materials, such as wood, stone, leather, textile and the like. In the case of wood, this preferably relates to imitation wood pores. According to another possibility, the recesses obtained in the first and/or the second aspect form chamfers or imitation chamfers, either on one or more edges of the final panels, or in the middle of the panel. Such chamfer can form, for example, an inclination or a V-groove or can form an imitation of a cement joint.

Wherein within the scope of the first and/or the second independent aspect a surface structure-altering agent is provided, this preferably is performed by means of a printing technique. In this manner, the desired relief, or the pattern of recesses, can be obtained in a simple, smooth and flexible manner. So, for example, can the same printing technique be applied both for forming the printed motif as well as for providing the surface structure-altering agents, such that possibly a similar resolution can be obtained in the motif and the relief. Preferably, a print is applied by means of a digital printing technique, such as inkjet printing. However, of course it is not excluded that printing techniques, such as offset printing or gravure printing, for example, by means of printing cylinders, are applied.

A method wherein a surface structure-altering agent is provided by means of a digital technique further generally also has the advantage that a large variety of reliefs can be manufactured. Moreover, it is possible to smoothly switch between different desired structures.

In the first as well as in the second aspect the surface structure-altering agent preferably is transparent. According to a particular possibility, the surface structure-altering agent is colored, either opaque or translucent. The coloring of the surface structure-altering agent preferably is performed by blending paints or pigments into the respective chemical agent. By using a colored surface structure-altering agent, in a smooth manner a relief can be obtained which coincides with a motif or color change. The use of a colored surface structure-altering agent forms as such a particular independent aspect of the present invention. In other words, the present invention, according its third independent aspect, relates to a method for manufacturing panels, with the characteristic that the panels comprise at least a substrate and a decorative top layer, wherein said decorative top layer comprises at least a printed motif and a transparent or translucent protective layer formed there above, and wherein the method comprises at least the following steps:

the step of providing a substrate;
the step of applying a finishing layer for forming at least a portion of the aforementioned protective layer;
the step of forming recesses at the surface of the aforementioned first finishing layer, wherein this step comprises the step of applying a surface structure-altering agent;

with the characteristic that the aforementioned surface structure-altering agent is colored.

It is clear that the invention also relates to panels which are obtained according to a method with the characteristics of one or more aspects of the invention. Herein, this may relate, for example, to a coated panel of the type which comprises at least a substrate and a top layer with a printed motif provided on this substrate, wherein said top layer also comprises a transparent or translucent synthetic layer which is provided above the aforementioned printed motif. Preferably, the material of the first and the second layer, in the first as well as in the second aspect, substantially forms this transparent or translucent synthetic layer.

According to all aspects, for the substrate of the coated panel of the invention use can be made of a substrate which comprises a wood-based material, such as MDF or HDF. According to another possibility, use can be made of a synthetic substrate, such as of a substrate on the basis of PVC (Polyvinyl chloride), whether or not filled with fillers such as chalk, or of a substrate on the basis of PET (Polyethylene terephthalate), PU (Polyurethane) or PP (Polypropylene). According to still another possibility, use can be made of a mineral-based substrate, for example, a gypsum fiberboard, a fiber cement board or a magnesite board.

Preferably, the coated panel relates to a panel of which the aforementioned printed motif is obtained by performing, directly or indirectly, a print on the aforementioned substrate.

It is clear that the coated panel, which is obtained by means of a method with the characteristic of the invention, shows a relief at the surface which is obtained by means of a technique according to one or more of the herein above-mentioned aspects.

According to all aspects of the invention, the top layer, and in particular the protective layer, such as the first and second finishing layer mentioned in the scope of the first and the second aspect, preferably extends substantially over the entire surface of the substrate. In this manner, a relief or structure can be obtained over the entire surface of the substrate. Preferably, material of the protective layer will also remain present in the deeper structure portions of the protective layer. In this manner, a good protection for the printed motif can be achieved.

Preferably, the aforementioned motif, according to all aspects of the invention, relates to a printed motif, which preferably is obtained by directly or indirectly performing a print on the aforementioned substrate. An indirect printing can be obtained, for example, in that printing is performed on one or more basic layers already provided on the substrate. According to the invention, it is, of course, not excluded that a motif is used which is printed on a flexible material sheet, which material sheet then is or will be completely or partially provided on the substrate. This may relate, for example, to a paper sheet or a thermoplastic foil, such as a PVC foil or a PET foil. Preferably, the aforementioned motif is obtained by means of a print by means of an inkjet printer with one or more print heads.

It is clear that the steps mentioned in all steps of the invention can be performed on larger boards, of which the final coated panels then are formed, for example, by subdividing these larger boards with a sawing machine, as well as to panels which already show approximately the dimensions of the final coated panels. In order to react smoothly to an order, and in order to exclude redundant stocks, it is advantageous to realize the structure and/or the motif as late as possible in the production. In such case they are preferably provided directly on panels which already show approximately or completely the dimensions of the final coated panels. In the same case, the respective panels can also already be provided with possible edge treatments, such as milled coupling means or other profiled edge portions. Of course, it is not excluded that such profiled edge portions are provided later during the production. Providing structure or relief panel per panel has the advantage that the risk that this structure disappears, for example, in that it is milled away or sawn away or removed in another manner, is considerably reduced, even if this relates to relatively limited structures, which are situated at the edge of the panel, such as chamfers with a depth of less than 1 millimeter.

Preferably, the position of the relief or the structure, according to all aspects of the invention, is referenced to a final edge or a final corner point of the coated panel, whether this edge now still must be obtained or not. This preferred embodiment can be realized most simple when the substrates already show the respective final edge or corner point, however, it is not excluded that even when the substrates do not yet show this final edge or corner point, still an alignment is performed with respect to the final edge or corner point to be formed, for example, in that other reference means are provided which take a position which refers to the respective final edge or corner point. The present preferred embodiment allows, for example, obtaining in a smooth manner symmetrical structures, such as tile imitations or floor part imitations with two- or four-sided lower edge, wherein then preferably the width of the lower edges on opposite sides of the coated panels is made equal or approximately equal.

Further, it is clear that according to all aspects of the invention preferably a structure is obtained which corresponds to the aforementioned printed motif.

Generally, it is noted that the relief, which is mentioned in all aspects of the invention, can also be limited in depth, such that in reality it relates to a pattern of different gloss degrees.

Further, it is also noted that the relief preferably is palpably present at the surface of the final coated panel. However, according to certain embodiments it is not excluded that the respective relief is present internally in the top layer of the coated panel and is not palpably, but in fact solely visibly present at the surface of the coated panel. Such embodiment can be achieved when the relief obtained via the techniques of the invention is finished further with additional finishing layers.

The invention, according to all its aspects, is finding particular application when manufacturing panels of which the substrate comprises thermoplastic components and/or polyurethane. Apart from polyurethane, for example, use can be made of PVC, PP, PE or PET. Preferably, a substrate is used which consists of a synthetic material composite, namely a substrate comprising a synthetic material as well as fillers, such as a substrate on the basis of filled PVC. Herein, the fillers can consist of $CaCO_3$, wood particles and/or bamboo particles. The content of filler can be between 15 and 85 percent by weight of the substrate. In case the synthetic material relates to PVC, then soft PVC, semi-rigid PVC or rigid PVC can be used, which respectively comprise a content of plasticizers of 15 phr (parts per hundred of the PVC resin) or more, between and 15 phr, or 5 phr or less.

The techniques of the present invention allow forming a structure or relief at the surface of a panel without, or only limited, mechanical pressure and heat supply. This possibility is particularly interesting with the above-mentioned substrates, which comprise thermoplastic components and/or polyurethane. In particular with these panels, it is difficult to form a structure or relief by means of mechanical pressure and/or heat in a reliable and repeatable manner. Namely, the material of such substrate is easily deformable under such circumstances, and possible stretching of the substrate and a printed relief situated there upon is detrimental for correctly applying a desired relief. Thus, the present invention offers possibilities for obtaining satisfying results with such panels, too. Preferably, the various methods of the invention are performed on substrates in board form and thus not on continuous webs of the substrate material. This contributes to the repeatability of the obtained structure or relief.

The above makes clear that the present invention, according to a fourth aspect, also relates to a panel, wherein this panel comprises at least a substrate and a decorative top layer, wherein said decorative top layer comprises at least a printed motif and a transparent or translucent protective layer formed there above, characterized in that the substrate comprises a thermoplastic synthetic material and/or polyurethane, wherein the substrate further comprises 15 to 85 percent by weight of filler, and that the aforementioned protective layer substantially consists of a radiation-cured, for example, UV- and/or excimer- and/or electron beam-cured lacquer layer and/or an acrylate layer, wherein the protective layer is provided with recesses, which preferably correspond to the aforementioned printed motif. Preferably, the printed motif consists of a print formed on the substrate, more particularly formed with the intermediary of one or more basic layers already provided on the substrate, said print preferably being formed by means of a digital printing procedure, such as by means of inkjet printing, preferably by means of UV-curing or water-based inks.

It is clear that the protective layer in the scope of the fourth aspect substantially consists of radiation-cured lacquer and/or acrylate. Hereby is meant that essentially the entire thickness of the protective layer is formed by the respective lacquer and/or acrylate, namely, preferably from at the printed motif to at the upper surface of the panel.

According to the most important embodiment, the substrate of the panel of the fourth aspect consists of highly filled PVC, preferably rigid PVC, namely with a plasticizer content of 5 phr or less. The filling degree preferably is more than 50 percent by weight, or even more than 70 percent by weight, of the substrate.

It is clear that the panels of the fourth aspect can also show the characteristics of panels which are obtained by means of the first, the second and/or the third aspect and/or the preferred embodiments thereof.

Preferably, the panels of the fourth aspect are floor panels. Preferably, the panels obtained in the first, second and/or the third aspect are floor panels.

BRIEF DESCRIPTION OF THE DRAWINGS

With the intention of better showing the characteristics of the invention, herein below, as an example without any limitative character, some preferred embodiments are described, with reference to the accompanying drawings, wherein.

DESCRIPTION OF NON-LIMITING EMBODIMENTS

Figures 1, 2, 3:
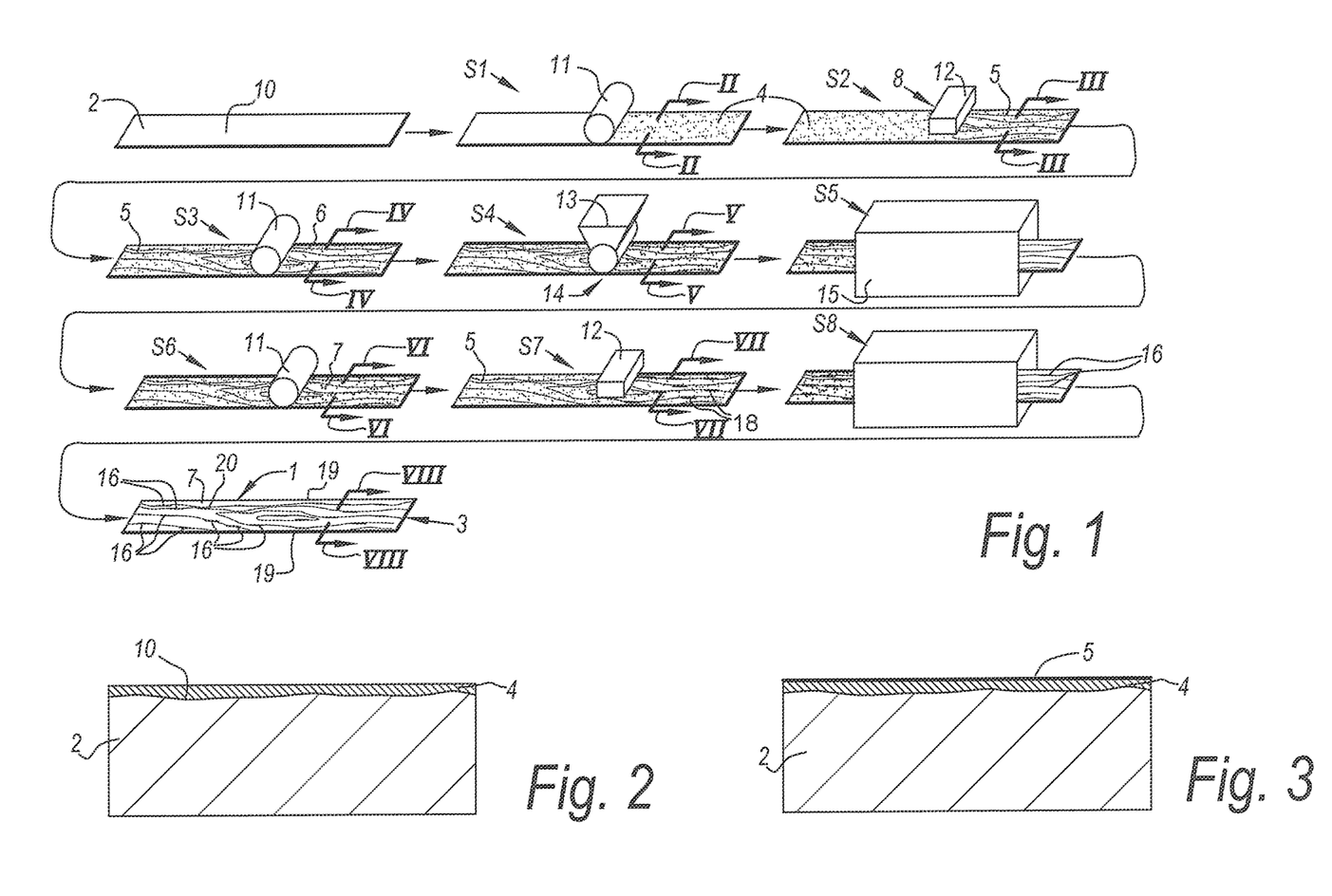
FIG. 1 schematically represents some steps in a method with the characteristics of the first independent aspect mentioned in the introduction.
FIGS. 2 to 8 represent cross-sections according to the lines II-II to VIII-VIII, respectively, indicated in FIG. 1.

FIG. 1 schematically represents some steps S1-S8 in a method for manufacturing coated panels 1 with the characteristics of the first aspect of the invention. The respective coated panels 1 are of the type which comprises at least a substrate 2, for example, an MDF or HDF basic panel, and a decorative top layer 3 provided on this substrate 2. In the example, the top layer 3 is composed of a plurality of material layers 4-7, amongst which a material layer 5 which shows a motif and which, during step S2, is provided in the form of a print 8 realized directly on the substrate 2.

In a preceding step S1, one or more basic layers 4 are provided at the surface of the substrate 2 that has to be printed with the motif. These may have to purpose to provide an even underlying surface and/or to provide a uniform or quasi-uniform background color and/or to provide an adherent underlying surface for material layers 5-7 which have to be provided later, such as for the material layer 5 with the motif, or for the first and second finishing layer 6-7 for forming the protective layer 9.

FIG. 2 represents the result of step S1 and shows that a possibly uneven surface 10 of the substrate 2 can be made flat or approximately flat by means of said one or more basic layers 4.

In the example, in step S1 an application technique is used by means of one or more rollers 11. It is clear that in step S1 of FIG. 1 also other application techniques can be applied for realizing one or more basic layers 4. Also, it is clear that it is not necessary for the invention that such basic layers 4 are applied, although this may be of importance for the quality of the motif. Instead of using a basic layer 4 which is applied in liquid form, also a basic layer 4 can be used which comprises a material sheet, such as a paper sheet, and which is provided on the substrate 2 in dry or practically dry form.

As aforementioned, in step S2 of FIG. 1 a motif is realized by means of a print 8 which is realized directly on the substrate 2 or on a basic layer 4 already provided on the substrate 2. The obtained motif relates to a wood motif which extends over the entire length of the oblong rectangular panel 1. Of course, the invention is not limited to such motifs.

In this case, for applying the printed motif use is made of an inkjet printer 12 with one or more heads. So, for example, use can be made of the techniques and devices which are known as such from EP 1 872 959, wherein, for example, such a battery of inkjet print heads are erected behind and next to each other that the entire surface of the panel 1 can be covered with a multicolor print. It is evident that the present invention, for step S2, neither is limited to inkjet printing techniques nor to motifs directly printed onto the substrate 2.

FIG. 3 represents the result of the print 8 performed directly on the substrate 2, in this case on a basic layer 4 already situated on the substrate 2.

Figure 4:
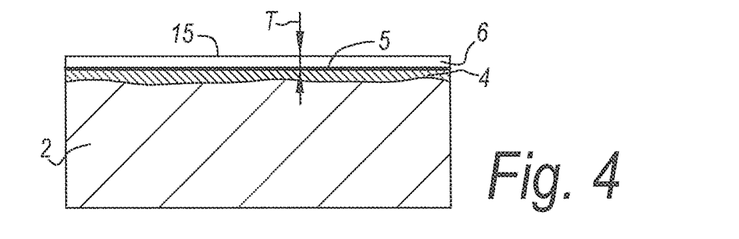

In step S3 of FIG. 1, the material of a first transparent finishing layer 6 is provided above the printed motif of the material layer 5 in order to form a first portion of the protective layer 9. According to the example, an application technique is used which works by means of one or more rollers 11. FIG. 4 represents, in cross-section, the result of step S3.

Figure 5:
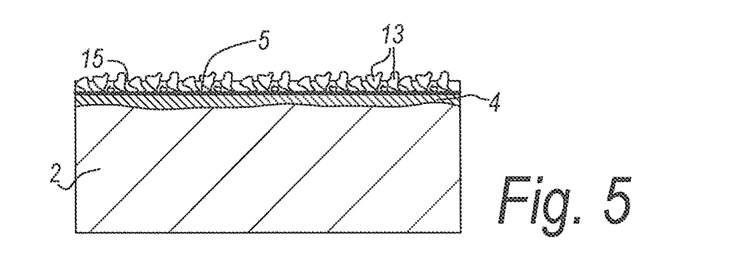

According to a preferred embodiment of the first aspect of the invention, in step S4 hard particles 13 are provided in the first finishing layer 6. According to the example, a strewing treatment 14 is applied. FIG. 5 represents the result. The hard particles 13 are aluminum oxide particles with an average particle size, which is chosen such that they protrude above the actual surface 15 of the first finishing layer 6, namely with an average particle size which is larger than the thickness T of the first finishing layer 6.

In step S5, the obtained first finishing layer 6, which comprises the hard particles 13, is at least partially cured, preferably by means of UV radiation.

Figure 6:
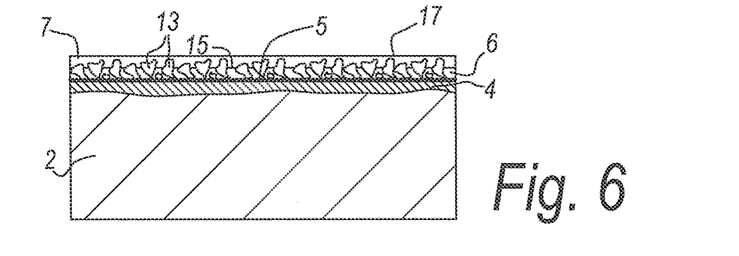

In step S6, a second transparent finishing layer 7 is provided, in this case in the same manner as in step S3. FIG. 6 represents the result.

The material of the finishing layers 6-7 preferably relates to synthetic material. Preferably, this relates to a transparent or translucent matter, which preferably extends over the entire respective panel 1. In the example, for the application thereof each time a roller 11 is represented. However, it is clear that these finishing layers 6-7 can be provided in any manner.

As represented in step S4, the first synthetic layer comprises hard particles 13. These are provided according to the example by means of a strewing treatment 14 in the still wet first finishing layer 6. According to a variant, they can also be blended or woven into the synthetic material of the first finishing layer 6 in advance or can be provided in the already provided first finishing layer 6 otherwise than by means of strewing.

In steps S7-S8, recesses 16 are formed at the surface 17 of the second finishing layer 7. In step S7, above the material of the second finishing layer 7 an additional print 18 is provided. This relates to a print 18 with a chemical agent which has a considerably lower surface tension than the material of the second finishing layer 7, or in other words by means of a repelling agent. The print 18 is performed with a pattern which shall determine the final structure or the relief of the coated panel 1. Herein, the pattern covers only particular locations and thus preferably does not extend over the entire surface of the final coated panel 1. In this case, the pattern forms a mask which provides the edges 19 of the panel 1 as well as certain locations 20 in the surface of the panel 1 with such repelling agent. Herein, the locations 20 in the surface of the panel 1 correspond to the wood flowers or wood nerves present in the wood motif and will lead to recesses 16 present in the final panel 1, which imitate wood pores. The locations at the edges 19 of the panel 1 will lead to the creation of lowered edge regions or chamfers, such as V-grooves.

Figure 8:
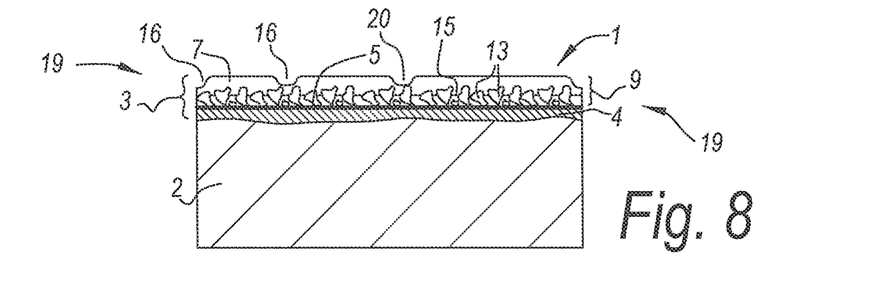

The hardening of step S8 preferably only has the purpose to fixate or harden the relief obtained in step S7. FIG. 8 shows the obtained result. As mentioned in the introduction, the particularity of the invention according to its first aspect consists in that a wear-resistant surface is obtained with a digitally obtained relief. As the particles 13 in the first finishing layer 6 protrude above the surface 15 of this first finishing layer 6, they are active as a wear-repellent agent in the second finishing layer 7, while influencing the process of forming recesses 16 in the second finishing layer 7 only to a limited extent. According to a not represented variant, the second finishing layer 7, too, may comprise hard particles, which then preferably have a smaller average particle size than the particles 13 in the first finishing layer 6.

Figure 7:
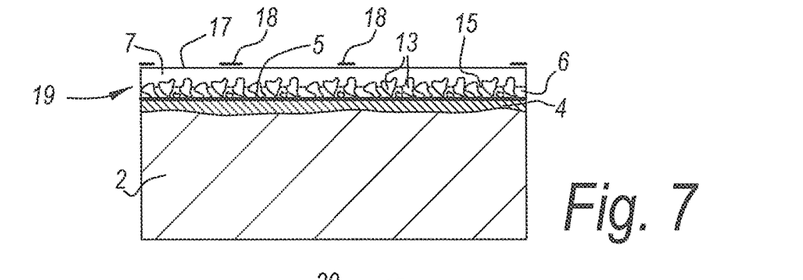

FIG. 7 again clearly shows the locations 19-20 of the print 18 provided in step S7.

In step S7 is represented that the print 18, which determines the relief or the structure, is provided by means of a digital printing technique, such as by means of an inkjet printer 12. It is clear that it is not excluded that the print 18 or the repelling agent is provided in another manner.

Figure 9:
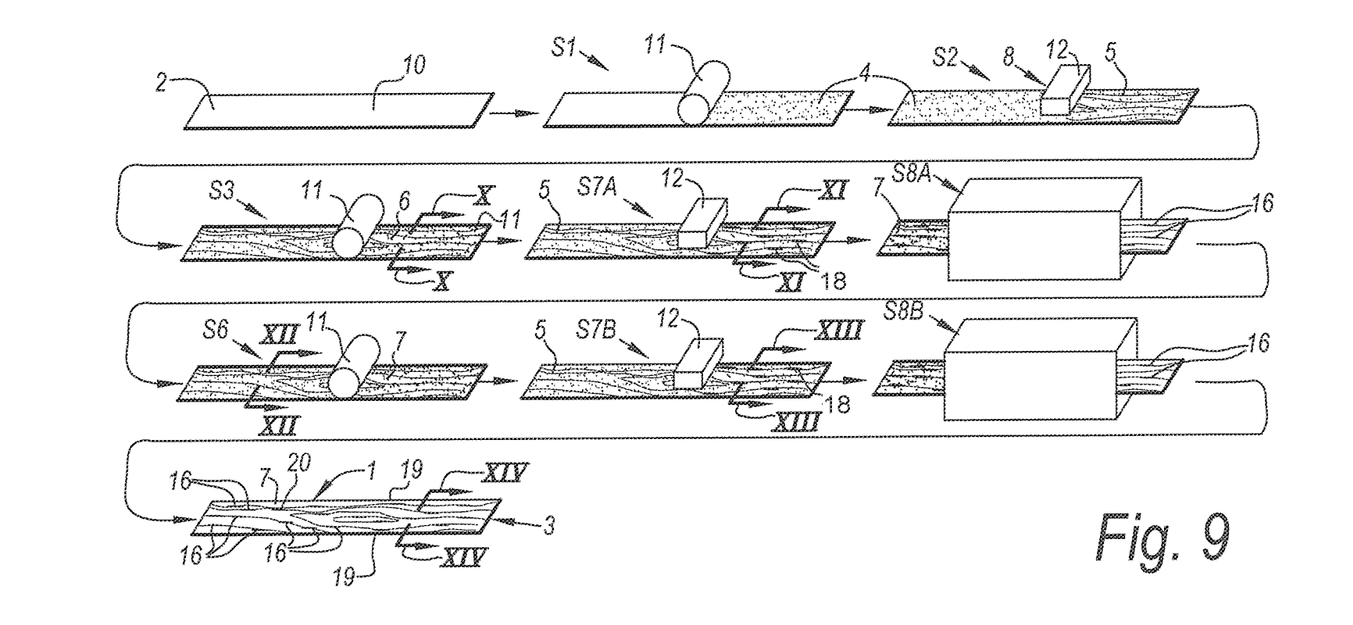
FIG. 9 schematically represents some steps in a method with the characteristics of the second independent aspect mentioned in the introduction.

FIG. 9 schematically represents some steps S1-S2-S3-S6-S7A-S7B-S8A-S8B in a method with the characteristics of the second aspect of the invention. The steps S1, S2, S3 and S6 are similar, as described by means of the example from FIG. 1. The steps S7A-S7B and S8A-S8B are similar respectively to the step S7 and S8 described by means of the example of FIG. 1. The particularity of the example of FIG. 9 is that in the first finishing layer 6 as well as in the second finishing layer 7 recesses 16 are formed. According to the example, this each time comprises applying a surface structure-altering agent in the steps S7A-S7B by means of a digital application technique, for example, as is the case here, by means of an inkjet printer 12, and at least partially hardening the respective finishing layer 6-7 in the steps S8A-S8B.

Figure 10:
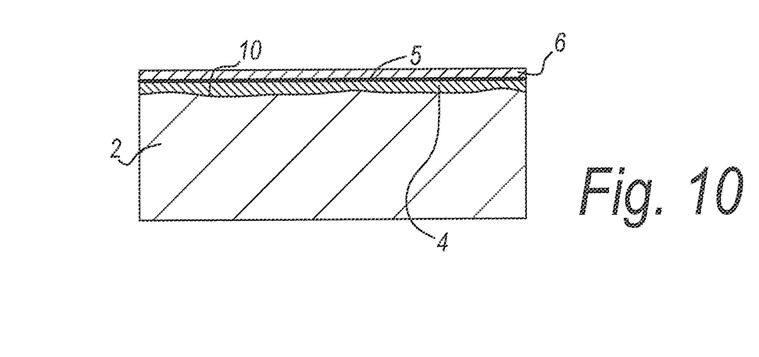
FIGS. 10 to 14 represent cross-sections according to the lines X-X to XIV-XIV, respectively, indicated in FIG. 9.
Figure 11:
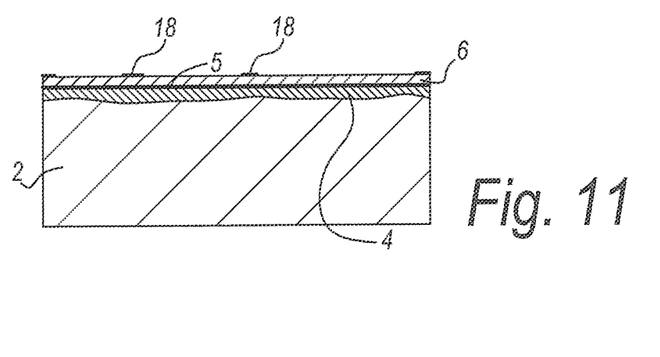
Figure 12:
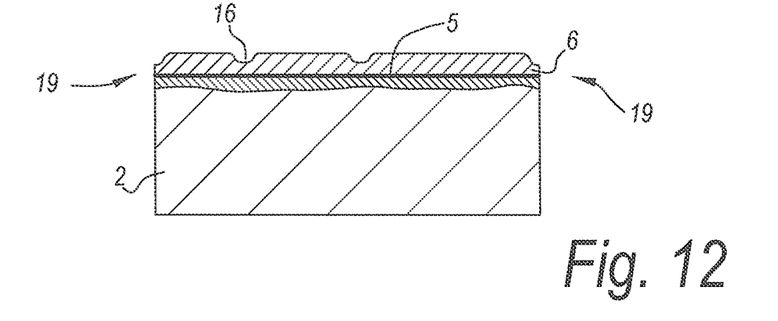
Figure 13:
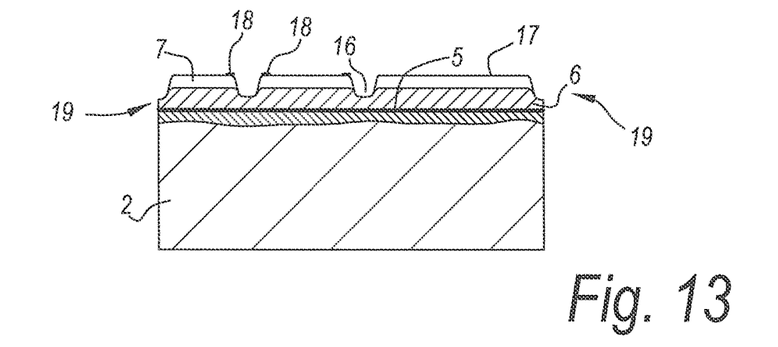
Figure 14:
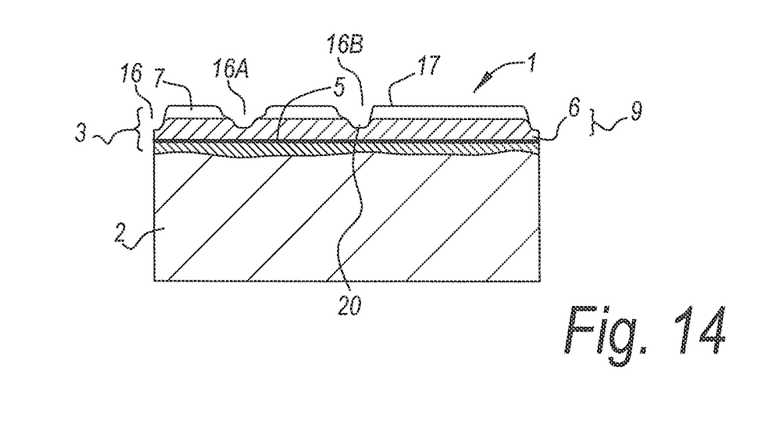

FIG. 10 represents in cross-section the result obtained after providing the material of the first finishing layer 6 in step S3. FIG. 11 represents the result after performing the print 18 with repelling agent in step 7A. FIG. 12 represents the relief realized in steps 7A and 8A. FIG. 13 represents the second finishing layer 7 provided in step S6 and the print 18 with repelling agent provided thereon in step 7B. It is noted that the roller 11 which is used in step S6 preferably is of the hard type, for example, a steel roller, such that the material of the second finishing layer 7 primarily is provided on the actual surface 15 of the first finishing layer 6 and not or less in the recesses 16 already realized in the surface 15 of the first finishing layer 6. FIG. 14 represents the finally obtained relief. From FIG. 14, it is clear that by means of the technique of the second aspect recesses 16 with different geometry can be realized. So, for example, are the recesses 16A and 16B realized with a different depth-over-width ratio.

Figures 15, 16, 17:
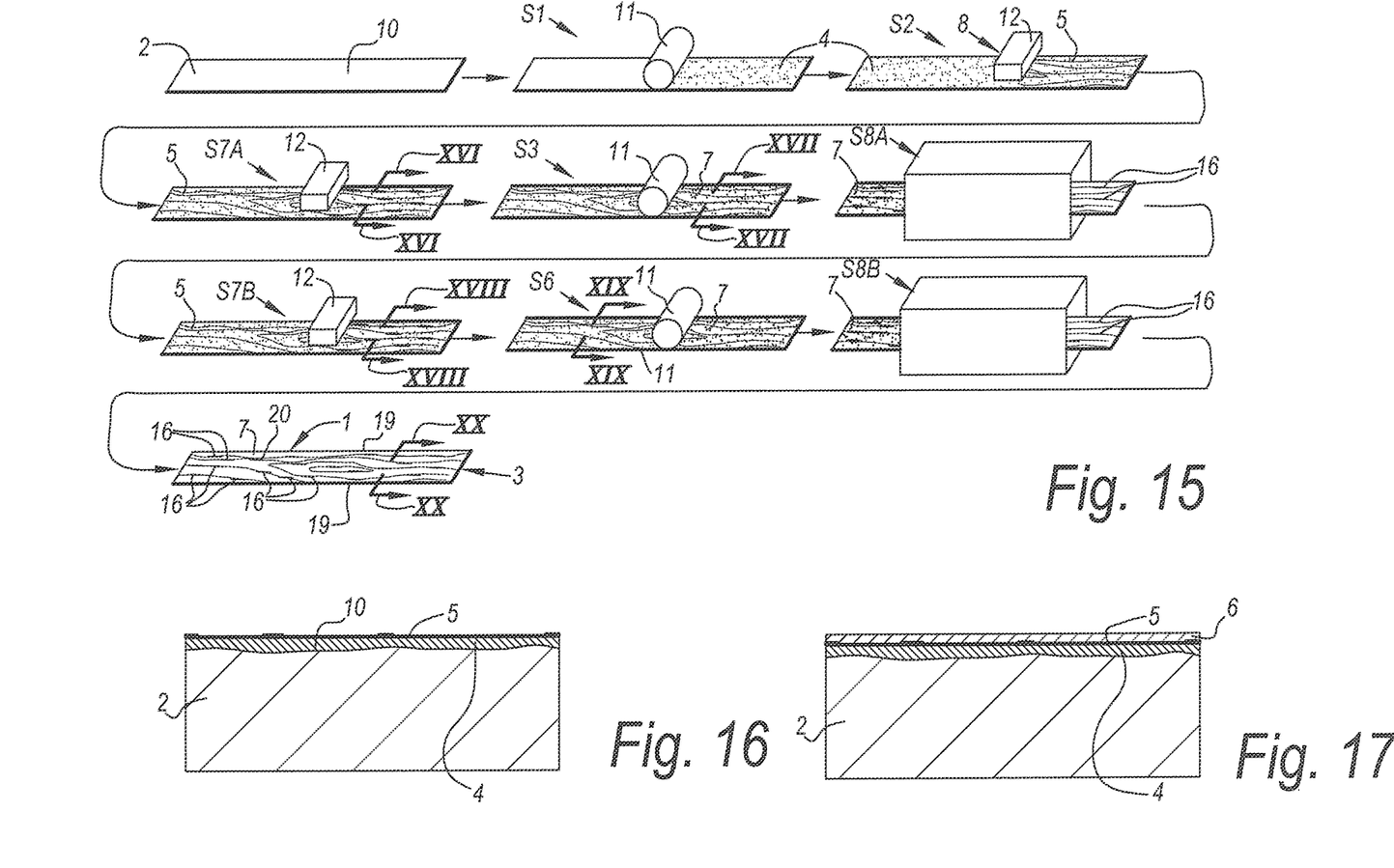
FIG. 15 schematically represents some steps in a method with the characteristics of the second independent aspect mentioned in the introduction.
FIGS. 16 to 20 represent cross-sections according to the lines XVI-XVI to XX-XX, respectively, indicated in FIG. 9.
Figure 18:
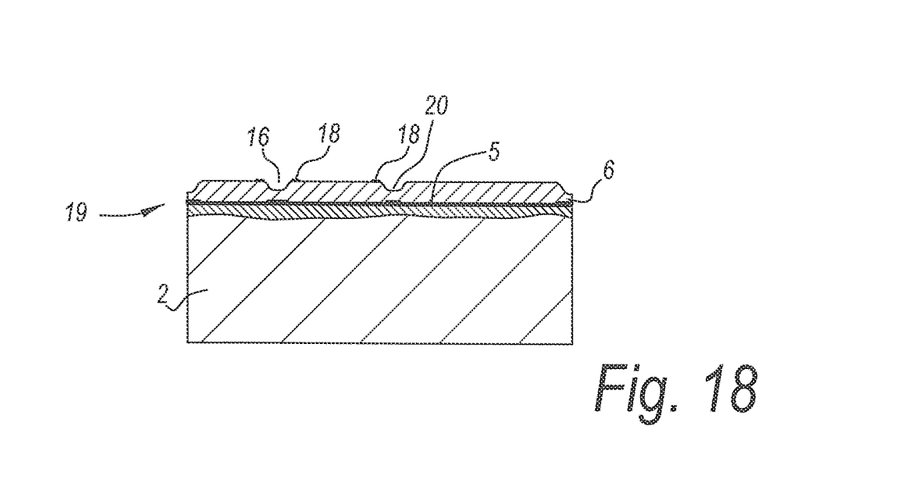
Figure 19:
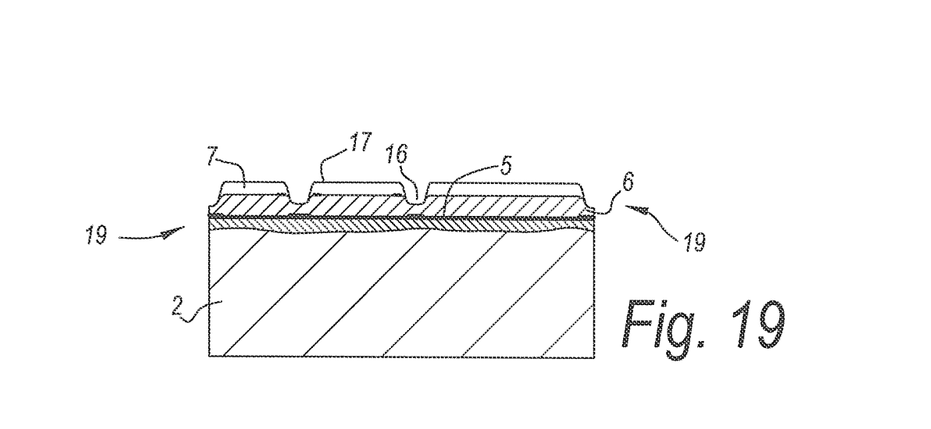
Figure 20:
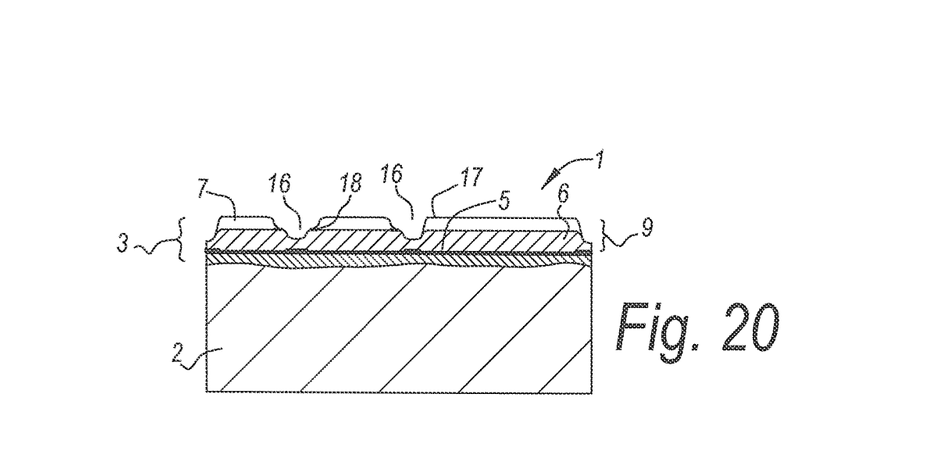

FIG. 15 represents another variant, which substantially corresponds to the embodiment of FIG. 10, however, wherein the steps S7A and S3, as well as S7B and S6 have changed in sequence. This variant means that the repelling agent each time is provided underneath the respective finishing layer 6-7 instead of there above. FIGS. 16 to 20 show that similar results can be achieved.

When, for example, in the embodiment of FIGS. 15 to 20, the repelling agent is colored, an embodiment is obtained with the characteristics of the third independent aspect mentioned in the introduction.

The present invention is in no way limited to the herein above-described embodiments, on the contrary can such methods and panels be realized according to various variants, without leaving the scope of the present invention.

What is claimed is:

1. A method for manufacturing panels having a substrate and a decorative top layer, the decorative top layer including a printed motif and a transparent or translucent protective layer formed there above, the method comprising:
   providing the substrate including the printed motif;
   applying a first finishing layer for forming a first portion of the protective layer;
   forming recesses at a surface of the first finishing layer by applying a first surface structure-altering agent that is colored;
   applying a second finishing layer on top of the first finishing layer for forming a second portion of the protective layer;
   forming recesses at a surface of the second finishing layer by applying a second surface structure-altering agent that is colored.

2. The method according to claim 1, wherein the first and the second surface structure-altering agents are chemical agents.

3. The method according to claim 2, wherein at least one of:
   the chemical agents break open material of the first and the second finishing layers; and
   the chemical agents repel the material of the first and the second finishing layers in that the chemical agents have a lower surface tension than the material of the first and the second finishing layer.

4. The method according to claim 2, wherein material of the first and the second finishing layer is a UV-curing lacquer.

5. The method according to claim 4, wherein the surface structure-altering agents are lacquer-repelling agents.

6. The method according to claim 1, wherein the recesses in the first and the second finishing layers are formed corresponding to the printed motif.

7. The method according to claim 1, wherein the second finishing layer is free from hard particles.

8. The method according to claim 1, wherein the first finishing layer includes hard particles.

9. The method according to claim 8, wherein the second finishing layer includes hard particles.

10. The method according to claim 9, wherein an average diameter of the hard particles in the second finishing layer is smaller than an average diameter of the hard particles in the first finishing layer.

11. The method according to claim 8, wherein the hard particles of the first finishing layer protrude above a surface of the first finishing layer.

12. The method according to claim 1, wherein the material of the first and the second finishing layers show a gloss degree different from each other.

13. The method according to claim 1, wherein the recesses in the second finishing layer are formed at respective locations of the recesses in the first finishing layer.

14. The method according to claim 1, further comprising partially hardening the first finishing layer before providing the second finishing layer.

\* \* \* \* \*